(12) United States Patent
Walmsley et al.

(10) Patent No.: US 11,549,229 B2
(45) Date of Patent: *Jan. 10, 2023

(54) CELLULAR STRUCTURES

(71) Applicant: Terram Limited, Gwent (GB)

(72) Inventors: William W. Walmsley, Bolton (GB); Basil John Thomas, Gwent (GB)

(73) Assignee: TERRAM LIMITED, Gwent (GB)

( * ) Notice: Subject to any disclaimer, the term of this patent is extended or adjusted under 35 U.S.C. 154(b) by 1162 days.

This patent is subject to a terminal disclaimer.

(21) Appl. No.: 16/123,307

(22) Filed: Sep. 6, 2018

(65) Prior Publication Data
US 2019/0003138 A1 Jan. 3, 2019

Related U.S. Application Data

(62) Division of application No. 12/879,124, filed on Sep. 10, 2010, now Pat. No. 10,094,085.

(30) Foreign Application Priority Data

Mar. 11, 2008 (GB) ...................................... 080448
Mar. 11, 2009 (WO) ................ PCT/GB2009/000673

(51) Int. Cl.
*E02D 17/20* (2006.01)
*E02B 3/12* (2006.01)
*E02B 3/14* (2006.01)

(52) U.S. Cl.
CPC ............ *E02D 17/202* (2013.01); *E02B 3/123* (2013.01); *E02B 3/126* (2013.01); *E02B 3/127* (2013.01); *E02B 3/14* (2013.01); *E02D 17/20* (2013.01); *Y10T 428/24157* (2015.01)

(58) Field of Classification Search
CPC combination set(s) only.
See application file for complete search history.

(56) References Cited

U.S. PATENT DOCUMENTS

| 1,412,742 | A | 4/1922 | Herbermann |
| 2,455,237 | A | 11/1948 | Davis |
| 3,645,961 | A | 2/1972 | Goldfein |
| 3,974,789 | A | 8/1976 | de Groot |
| 4,011,728 | A | 3/1977 | Turzillo |
| 4,086,015 | A | 4/1978 | Eliasson |

(Continued)

FOREIGN PATENT DOCUMENTS

| CN | 2683703 Y | 3/2005 |
| CN | 270793 Y | 6/2005 |

(Continued)

OTHER PUBLICATIONS

International Search Report and Written Opinion of international application No. PCT/US2006/037945 dated Dec. 3, 2007, all enclosed pages cited.

(Continued)

*Primary Examiner* — Kyle Armstrong
(74) *Attorney, Agent, or Firm* — Burr & Forman LLP (57) ABSTRACT

A cellular structure includes a plurality of interconnected cells of fabric material. The cells are at least partially filled with a composite fill material that includes a particulate material and a bonding agent. A cellular unit made up of a plurality of the interconnected cells may have an associated load-bearing frame to enable lifting and/or transportation of the structure. The fill material is preferably resilient.

11 Claims, 7 Drawing Sheets

(56) References Cited

U.S. PATENT DOCUMENTS

| | | | |
|---|---|---|---|
| 4,184,788 A | 1/1980 | Colle |
| 4,198,454 A | 4/1980 | Norton |
| 4,477,206 A | 10/1984 | Papetti et al. |
| 4,530,622 A | 7/1985 | Mercer |
| 4,572,705 A | 2/1986 | Vignon et al. |
| 4,591,090 A | 5/1986 | Collins et al. |
| 4,630,395 A | 12/1986 | Nasatka |
| 4,643,271 A | 2/1987 | Coburn |
| 4,655,637 A | 4/1987 | Vignocchi |
| 4,717,283 A | 1/1988 | Bach |
| 4,722,954 A | 2/1988 | Hallworth |
| 4,726,705 A | 2/1988 | Gomes |
| 4,726,708 A | 2/1988 | Papetti |
| 4,778,309 A | 10/1988 | Bach et al. |
| 4,785,604 A | 11/1988 | Johnson, Jr. |
| 4,797,026 A | 1/1989 | Webster |
| 4,822,657 A | 4/1989 | Simpson |
| 4,854,767 A | 8/1989 | Sasaki |
| 4,879,154 A | 11/1989 | Bennett |
| 4,904,121 A | 2/1990 | Hallberg |
| 4,937,993 A | 7/1990 | Hitchins |
| 4,945,689 A | 8/1990 | Johnson, Jr. |
| 5,039,250 A | 8/1991 | Janz |
| 5,041,250 A | 8/1991 | Neefe |
| 5,161,917 A | 11/1992 | Papetti |
| 5,199,825 A | 4/1993 | Travis |
| 5,225,622 A | 7/1993 | Gettle et al. |
| 5,270,095 A | 12/1993 | Ito et al. |
| 5,277,520 A | 1/1994 | Travis |
| 5,333,970 A | 8/1994 | Heselden |
| 5,409,420 A | 4/1995 | Setteducati |
| 5,472,297 A | 12/1995 | Heselden |
| 5,534,343 A | 7/1996 | Landi et al. |
| 5,549,410 A | 8/1996 | Beryozkin et al. |
| 5,581,505 A | 12/1996 | Lee |
| 5,636,938 A | 6/1997 | Ragazzo |
| 5,647,695 A | 7/1997 | Hilfiker et al. |
| 5,677,016 A | 10/1997 | Ferraiolo |
| 5,678,358 A | 10/1997 | Koledin |
| 5,684,264 A | 11/1997 | Cassells et al. |
| 5,830,548 A | 11/1998 | Andersen et al. |
| 5,860,551 A | 1/1999 | Knott, Sr. |
| 5,918,309 A | 7/1999 | Bachner, Jr. |
| 5,927,906 A | 7/1999 | Bach et al. |
| 5,939,658 A | 8/1999 | Muller |
| 6,484,473 B1 | 11/2002 | Hall |
| 6,517,279 B1 | 2/2003 | Camomilla et al. |
| 6,544,624 B1 | 4/2003 | Lopez-Anido et al. |
| 6,581,505 B1 | 6/2003 | Levell |
| 6,666,124 B2 | 12/2003 | Fleming |
| 6,749,076 B2 | 6/2004 | Fingerhut et al. |
| 6,786,126 B2 | 9/2004 | Sargent |
| 6,807,890 B1 | 10/2004 | Fuqua |
| 6,817,806 B1 | 11/2004 | Arellanes |
| 6,893,193 B2 | 5/2005 | Santha |
| 6,907,811 B2 | 6/2005 | White |
| 7,117,644 B2 | 10/2006 | Dehart |
| 7,159,503 B1 | 1/2007 | Weatherwax |
| 7,214,005 B1 | 5/2007 | Davis |
| 7,249,912 B2 | 7/2007 | Reese |
| 7,357,602 B2 | 4/2008 | Ferraiolo |
| 7,425,107 B2 | 9/2008 | Derache |
| 7,431,534 B2 | 10/2008 | Harbeck |
| 7,591,611 B2 | 9/2009 | Arellanes et al. |
| 7,678,440 B1 | 3/2010 | McKnight et al. |
| 8,425,158 B2 | 4/2013 | Milton et al. |
| 8,790,036 B2 | 7/2014 | Halahmi et al. |
| 2001/0002968 A1 | 6/2001 | Black |
| 2002/0127384 A1 | 9/2002 | Mulligan et al. |
| 2003/0035690 A1 | 2/2003 | Earl |
| 2003/0095834 A1 | 5/2003 | Witcher |
| 2003/0221256 A1 | 12/2003 | Monk et al. |
| 2004/0118271 A1 | 6/2004 | Puckett et al. |
| 2004/0151404 A1 | 8/2004 | Richardson, Jr. et al. |
| 2004/0251698 A1 | 12/2004 | Welch et al. |
| 2005/0117978 A1 | 6/2005 | Loffel |
| 2005/0123355 A1 | 6/2005 | Kolenski et al. |
| 2005/0170720 A1 | 8/2005 | Christiansen et al. |
| 2005/0217471 A1 | 10/2005 | Benitsch |
| 2005/0229771 A1 | 10/2005 | Lewis |
| 2005/0252794 A1 | 11/2005 | Bullock et al. |
| 2006/0048640 A1 | 3/2006 | Terry et al. |
| 2006/0062944 A1 | 3/2006 | Gardner et al. |
| 2006/0147275 A1 | 7/2006 | Lin et al. |
| 2006/0147276 A1 | 7/2006 | Lin et al. |
| 2006/0248827 A1 | 11/2006 | Meeker |
| 2006/0275084 A1 | 12/2006 | Harbeck |
| 2006/0291962 A1 | 12/2006 | Ferraiolo |
| 2007/0000377 A1 | 1/2007 | Ohnstad |
| 2007/0031667 A1 | 2/2007 | Hook et al. |
| 2007/0140598 A1 | 6/2007 | McGillick, Sr. et al. |
| 2007/0245933 A1 | 10/2007 | Kramer et al. |
| 2007/0293107 A1 | 12/2007 | Folio et al. |
| 2008/0023156 A1 | 1/2008 | MacAllen et al. |
| 2008/0038064 A1 | 2/2008 | Arrellanes et al. |
| 2008/0145599 A1 | 6/2008 | Khan et al. |
| 2008/0264546 A1 | 10/2008 | Olsta et al. |
| 2008/0290141 A1 | 11/2008 | Shaw et al. |
| 2008/0292854 A1 | 11/2008 | Miller et al. |
| 2009/0142144 A1 | 6/2009 | Erez et al. |
| 2009/0169311 A1 | 7/2009 | Sharley et al. |
| 2009/0230373 A1 | 9/2009 | Helseden |
| 2009/0235507 A1 | 9/2009 | Cashin et al. |
| 2009/0235813 A1 | 9/2009 | Cashin et al. |
| 2009/0235814 A1 | 9/2009 | Cashin et al. |
| 2009/0250675 A1 | 10/2009 | Cashin et al. |
| 2009/0324346 A1 | 12/2009 | Milton et al. |
| 2010/0024343 A1 | 2/2010 | Eggermont |
| 2010/0043630 A1 | 2/2010 | Sayre et al. |
| 2010/0072101 A1 | 3/2010 | Heselden |
| 2010/0080941 A1 | 4/2010 | McCarville et al. |
| 2010/0095588 A1 | 4/2010 | Hashimoto |

FOREIGN PATENT DOCUMENTS

| | | |
|---|---|---|
| DE | 10025125 A1 | 11/2001 |
| EP | 0106745 A2 | 4/1984 |
| EP | 0136747 A1 | 10/1985 |
| EP | 0285378 A1 | 10/1988 |
| EP | 0378309 A1 | 7/1990 |
| EP | 0378310 A1 | 7/1990 |
| EP | 0735198 A1 | 10/1996 |
| EP | 1308562 A1 | 5/2003 |
| EP | 1418276 A2 | 5/2004 |
| FR | 2699948 A1 | 7/1994 |
| FR | 2716688 A1 | 9/1995 |
| FR | 2824340 A1 | 11/2002 |
| GB | 974066 | 11/1964 |
| GB | 1208205 | 10/1970 |
| GB | 2029802 A | 3/1980 |
| GB | 2078833 A | 1/1982 |
| GB | 2314802 A | 1/1998 |
| GB | 2432611 A | 5/2007 |
| GB | 2440147 A | 1/2008 |
| JP | 58106020 A | 6/1983 |
| JP | 58189425 A | 11/1983 |
| JP | 07213159 A | 8/1995 |
| KR | 20040111216 A | 12/2004 |
| WO | 199012160 A1 | 10/1990 |
| WO | 199319250 A1 | 9/1993 |
| WO | 199727368 A1 | 7/1997 |
| WO | 199815693 A1 | 4/1998 |
| WO | 199957200 A1 | 11/1999 |
| WO | 199963166 A1 | 12/1999 |
| WO | 2003038196 A1 | 5/2003 |
| WO | 2004079094 A2 | 9/2004 |
| WO | 2005080691 A1 | 9/2005 |
| WO | 2006134136 A1 | 12/2006 |
| WO | 2009019500 A1 | 2/2007 |
| WO | 2008037972 A1 | 4/2008 |

(56) References Cited

FOREIGN PATENT DOCUMENTS

| WO | 2010007279 A1 | 1/2010 |
|----|---------------|--------|
| WO | 2010103128 A1 | 9/2010 |

OTHER PUBLICATIONS

International Preliminary Report on Patentability of international application No. PCT/US2006/037945 dated Apr. 1, 2008, all enclosed pages cited.
International Search Report and Written Opinion of international application No. PCT/US2009/038060 dated May 28, 2009, all enclosed pages cited.
International Search Report and Written Opinion of international application No. PCT/GB2009/000673 dated Jun. 24, 2009, all enclosed pages cited.
International Search Report and Written Opinion of international application No. PCT/US2009/037785 dated Nov. 13, 2009, all enclosed pages cited.
International Search Report and Written Opinion of international application No. PCT/US2009/037780 dated Nov. 16, 2009, all enclosed pages cited.
International Preliminary Report on Patentability of international application No. PCT/GB2009/000673 dated Sep. 14, 2010, all enclosed pages cited.
International Preliminary Report on Patentability of international application No. PCT/US2009/037780 dated Sep. 28, 2010, all enclosed pages cited.
International Preliminary Report on Patentability of international application No. PCT/US2009/037785 dated Sep. 28, 2010, all enclosed pages cited.
International Preliminary Report on Patentability of international application No. PCT/US2009/038060 dated Sep. 28, 2010, all enclosed pages cited.
Search Report of United Kingdom application No. GB1112549.9 dated Oct. 6, 2011, all enclosed pages cited.
Extended European Search Report and Written Opinion of European application No. 10 188 494.8 dated May 31, 2012, all enclosed pages cited.
Extended European Search Report and Written Opinion of European application No. 10 188 497.1 dated Mar. 4, 2013, all enclosed pages cited.
Extended European Search Report and Written Opinion of European application No. 11 160 518.4 dated Mar. 7, 2013, all enclosed pages cited.
International Search Report and Written Opinion of international application No. PCT/GB2012/051750 dated Aug. 1, 2013, all enclosed pages cited.
Third Party Observation of international application No. PCT/GB2012/051750 mailed Nov. 21, 2013, all enclosed pages cited.
International Preliminary Report on Patentability of international application No. PCT/GB2012/051750 dated Jan. 21, 2014, all enclosed pages cited.
Communication pursuant to Article 94(3) EPC of European application No. 09 720 867.2 dated Nov. 10, 2015, all enclosed pages cited.
Communication pursuant to Article 94(3) EPC of European application No. 09 720 867.2 dated Nov. 9, 2016, all enclosed pages cited.

CELLULAR STRUCTURES

CROSS-REFERENCE TO THE RELATED APPLICATIONS

This application is a divisional application of U.S. patent application Ser. No. 12/879,124 filed on Sep. 10, 2010, and which is a continuation of, and claims benefit under 35 U.S.C. 120 to International Application PCT/GB2009/000673 filed Mar. 11, 2009, which claims the benefit of Great Britain Application no. 080448.7, filed Mar. 11, 2008. U.S. patent application Ser. No. 12/879,124 and International Application No. PCT/GB2009/000673 are incorporated herein by reference in their entirety.

FIELD

The present invention relates to cellular structures, in particular to cellular structures including a composite fill material.

BACKGROUND

Cellular confinement systems are commonly used in civil engineering applications for land reinforcement, erosion control, embankment stabilisation, retaining structures and channel protection. Cellular systems such as those available from the UK company Terram Limited are made from various grades of thermally bonded nonwoven geotextile material. Such geotextile materials have the flexibility of a fabric combined with a high tensile strength and relatively high stiffness. They are water permeable so soils are prevented from intermixing while still permitting water to flow freely through the system.

Geotextile cellular systems can be used to confine all kinds of aggregates, soils, sand, etc. of any particle size. They are commonly used in a single layer to help prevent erosion by confining soil on slopes. For example, the 'Erocell' system from Terram Limited can be used in the prevention of topsoil erosion on slopes. Cellular systems prevent horizontal movement of the confined material, substantially improving the material shear strength and bearing capacity. They can be used to form access roads, hard standings, embankment slopes, containment dykes and levees, landfill lining and covers, dam faces and spillways, noise abatement walls and parking areas. Alternatively, such cellular structures can be stacked in order to support slopes, construct walls, or form other defensive and protective structures.

Such geotextile cellular systems are typically collapsible, which allows them to be transported flat, deployed on-site and filled on demand. However, the time and energy (manpower, machinery, etc.) required to fill the cellular structure is desirably offset against the convenience of flat-pack delivery. Such systems may not always be suited to situations where it is desired to form a solid structure such as a wall or barrier relatively quickly.

Furthermore, the structural properties of a structure resulting from the filling of a cellular system will depend on the fill materials used, which are usually limited to locally available fill materials, and on the filling method. Whereas larger aggregate materials may allow for faster filling, such fill materials may not always be suitable where the cellular structure is required to act as a more robust impact barrier or in some ballistics defence applications, for example. A problem with finer particulate fill materials such as soil or sand is that they have free-flowing or liquid characteristics, making them potentially more difficult to handle and constrain in some situations.

SUMMARY

From a first aspect the present invention provides a cellular structure including a plurality of interconnected cells of fabric material, the cells being at least partially filled with a composite fill material including a particulate material and a bonding agent.

Thus the invention can provide a pre-filled, three-dimensional structure which combines the support and reinforcement of a cellular fabric structure with the desirable physical properties of a composite fill material.

The cells are preferably directly interconnected to one another by the fabric material. Preferably the cells each have fabric walls in common with adjacent cells. The structure is preferably in the form of a cellular unit having at least three and preferably at least four rows of cells, each row including at least three and preferably at least four cells. Preferably the cellular unit includes a single layer of such cells.

Preferably the composite material provides a solid, rather than fluid, fill. However this does not mean that the fill material is desirably rigid or inelastic, as will be explained below. The bonding agent preferably bonds together the particulate material, which is distributed throughout the fill, and also preferably bonds the composite fill material to the fabric material of the cells. The composite fill material can have the relatively high density and uniformity of a particulate material but with structural integrity and stability provided by the bonding agent. The particulate material is bound in the composite and cannot escape, allowing it to be exposed in open cells without the need for sealing or covering means, if desired. The present invention thus allows a particulate material, such as sand, to be contained within an open cellular structure and for the structure so-filled to be transported and deployed immediately on site without the need for erection, filling and compaction. The pre-filled cellular structure can be rapidly deployed and instantly used as a wall, barrier or other defence structure, for example. One or more of the cellular structures or units may be stacked side by side and/or on top of one another. Applications may include civil defence e.g. vehicle barriers or flood protection and military defence e.g. ballistics protection.

The structure is advantageously formed of a plurality of interconnected, high mass units which result in strength and resilience to impact, shear forces and rupture. The overall structural properties can advantageously be adjusted by the choice of composite fill material. Moreover the cells are filled during the manufacturing process, enabling the structures to have uniform and reproducible characteristics. The variability of on-site fill materials and methods is eliminated.

The bonded composite fill material may not completely fill the cells of a structure. The composite fill material including a particulate material and a bonding agent preferably forms a base and/or upper fill layer for the cells. This aids containment of the fill, especially where, as is preferred, the cells are open at the top and/or bottom. In some embodiments at least, the rest of the cells may be filled with a different material. The other fill material preferably does not include a bonding agent. The unbonded fill material may be loose or fluid. A particulate fill material is still preferred to enable filling and achieve a high density. However, such an unbonded fill material may contain a binding agent such as fibres to increase cohesion. The cells may therefore include a mixture of bonded and bound fill materials. The benefits of fibre binding and/or reinforcement are discussed in more detail below.

It will be appreciated that the fabric material of the cells is preferably flexible and thus the structure may not be entirely rigid. A geotextile nonwoven material is preferred. It is preferable in many applications that the composite fill material is also resilient, providing a cellular structure which has a degree of flexibility overall. Preferably the bonding agent resiliently binds the particulate material so as to retain a desired degree of flexibility. The bonding agent is therefore preferably elastomeric when set. Thus according to a preferred embodiment the entire structure can react resiliently to lateral and longitudinal displacements and shear forces resulting from impact. In other words, the structure is shock absorbing and impact resistant. This can make the structure particularly effective against vehicular penetration, e.g. for use in crash barriers. The structure may also be able to withstand an explosive blast and find use e.g. in bomb shelters and bunkers.

A preferred resilient structure includes a compliant, undulating outer surface. This surface may be provided by partly cylindrical cells on its outer sides. The interior of such a structure may be divided into multiple interior cells by intersecting internal fabric walls, e.g. formed from strips. Such a structure can provide a cushioned outer surface particularly suitable for use as a crash barrier, bunker, or the like. The undulating outer surface can advantageously enhance the resilient response of the structure and could even result in deflection of an impacting body.

The preferably resilient structure may also be used in ballistics protection. In particular, it has been found that small-arms fire such as bullets will be slowed as they pass through the resiliently flexible, energy-absorbing structure and even stopped. The bullets are advantageously absorbed and become embedded in the structure without tearing it apart, whereas e.g. concrete blocks would crack and shatter under fire. The composite fill material has been found to provide superior ballistics performance and better stability when compared to a loose sand fill. Even if the fabric material is ruptured under fire, the bonded composite will not leak out.

The preferably resilient structure may advantageously absorb or contain a blast without shattering or breaking upon impact. This represents an improvement e.g. over concrete.

The cellular fabric matrix helps to maintain structural integrity despite multiple impacts and bullet penetrations, for example. Furthermore it is apparent that even if one of the cells in the structure should be damaged or ruptured in some way, the effect on the overall strength of the structure can be minimal as the other cells remain intact. Blast resistance can be high. Where ballistics and explosions are involved, there is the advantage that the fabric and composite fill materials will not create metal shrapnel if hit.

A further advantage of the structure's resilient flexibility is that it is able to conform at least partly to the shape of a surface on or against which it is placed. As a consequence the surface contact area and hence the surface friction resisting movement of the structure under impact is maximised. This represents a significant advantage over other solid and inelastic units used to build walls, barrier, defences, etc. such as concrete breeze blocks. Resiliently flexible structures in accordance with the preferred embodiment may be considered to provide the conformability of traditional sand bags but with additional elasticity and the extra strength of an interconnected cellular structure.

The high coefficient of friction that the flexible cellular structure generates when contacting another surface can also aid vertical stacking of the structures to form sheer walls and upright barriers of any desired height. Whereas cellular structures filled with fine particulate material such as soil or sand typically have to be stacked with subsequent layers stepped back from one another, in order to stabilise the stack, resiliently flexible cellular structures in accordance with the preferred embodiment can be stacked directly on top of one another to form vertical walls. Furthermore particulate material cannot leak out between the layers where it is retained by the bonding agent in the composite fill material. A seal is advantageously not required between adjacent layers of stacked cellular units, as the fill material is preferably solid, at least at the exposed surfaces of the fill. However, in a set of less preferred embodiments, an overlapping strip or 'skirt' may be provided between the cells e.g. to help with alignment and/or to strengthen the stacked structure. In preferred embodiments, on the other hand, there is no sealing means arranged between vertically juxtaposed cellular structures.

When several cellular structures or units are stacked side-by-side and vertically to form larger barriers and walls, the preferably resiliently flexible units will conform and provide many points of contact between their adjacent surfaces. Such a stacked structure is therefore less likely to break apart under impact, for example as compared to a barrier built from rigid concrete blocks.

The bonding agent is preferably an elastomeric material, such as a rubber-based adhesive. The rubber material may be a synthetic rubber but preferably it is a natural rubber, for example a latex rubber. Both natural rubbers and synthetic rubbers are readily and cheaply available and therefore production costs are minimised. Alternatively, the bonding agent may be a non-flexible resin including flexible particles, the particles being formed from rubber for example, so that the material overall is elastomeric. In another alternative the bonding agent may not itself be initially elastomeric but it may form an elastomeric cross-linked network upon curing.

The bonding agent may include a curable material. In the case of a water-based adhesive, such as latex adhesive, curing is achieved by drying. Heat sensitive catalysts may be added that enable the bonding agent to cure and the composite material to set at relatively low temperatures e.g. 45° C., and not necessarily by removing all of the moisture from the material. However it has been found that the relatively large volume and mass of the filled cells do not make it economically feasible to dry the composite material using heat to cure the bonding agent. It is therefore preferred that a catalyst is used to initiate chemical cross-linking of the bonding agent, preferably without heating. Any appropriate catalyst can be used; one suitable catalyst for curing natural latex rubber is calcium chloride granules.

Preferably the composite fill material is permeable to gas and liquid. The particulate material and bonding agent may be mixed and formulated such that individual particles are lightly coated with the bonding agent ensuring that the spaces between adjacent particles remain open to the passage of fluids. Additionally or alternatively the bonding agent may shrink during curing, causing it to recede from significant portions of the surface area of the particulate material. Thus the natural porosity of the original loose particulate material may be preserved or even increased relative to a compacted fill of unbonded particles.

It is preferred that the fabric material of the cells is also gas and liquid permeable, for example a geotextile material is preferably used. In preferred embodiments the structure is therefore resistant to water-logging and will not become significantly heavier when wet. By allowing the movement of water and nutrients vegetation may also be encouraged to grow, depending on the composite fill material. Such vegetated structures can provide increased strength through the root structure and result in a more natural finished appearance, compatible with the local environment and ecology.

A permeable cellular structure in accordance with preferred embodiments can advantageously be used to form flood protection barriers. After stopping the initial flood impact, water can drain through the preferably permeable material of the cells and filler, leaving behind a solid protective barrier.

The particulate material may be any suitable natural or synthetic particulate material. The composite fill material is versatile in terms of the materials from which it may be manufactured, e.g. depending on its end use. The particulate material is preferably sand, although other materials such as zeolite, recycled glass, carbon or the like may be used instead or in addition. More than one type and/or size of particulate material may of course be used e.g. a combination of sand and zeolite.

Additional reinforcing material such as fibres may be included in the composite. A fibrous material may act as a binding agent for the composite. The fibres may be formed of any suitable material, such as a material that is relatively inert and impervious to water.

For example, chopped synthetic fibres such as polypropylene fibres or similar may be added to the composite fill material. Such fibre reinforcement has been used in concrete for many years and is also known to provide soil stabilization. Additionally or alternatively, natural fibres, steel fibres and/or glass fibres may possibly be used. Such fibrous material may increase the structural integrity of the composite fill and improve its load bearing and shearing strength, while also helping it to be elastic and flexible. Cells filled with the composite may therefore have greater impact, abrasion and shatter resistance, and improved shock absorbing and cushioning characteristics.

The fibres may be uniformly distributed and/or randomly oriented. The reinforcing and/or binding character will depend on various factors such as the fibre material, geometry, distribution, orientation and density. The fibres may be in the form of monofilaments or a fibrillated tape. Relatively short length fibres may be preferred, for example fibres between 0.5 and 10 cm in length, preferably between 0.5 to 1.5 cm in length. The fibres may contain filaments which range in size from about 8 dtex up to a few hundred dtex, where the unit decitex (dtex) is the mass in grams per 10,000 metres of a single filament. Up to 5% by weight of fibre may be included in the composite. The amount of fibre is chosen to provide a desired reinforcing and/or binding effect. The addition of fibres to the composite may also improve its water distribution properties. Such fibre material may also be used in other fill materials which do not contain a bonding agent, for example in a cellular structure provided with a mixed fill, as is described above. The fibres preferably act as a binding agent in a non-bonded fill material.

The particulate material may be formed from substantially spherical particles or other particle shapes. For example, a spherical particulate material may be preferred due to its ability to provide a uniform distribution of particles in a lattice-like configuration. Alternatively, non-spherical particles may be preferred due to their irregular shape which may provide a non-complimentary stacking configuration thereby enhancing the natural porosity of the particulate material.

The particulate material may be uniformly distributed throughout the composite. A uniform distribution may provide a consistent performance.

The appropriate bonding agent to particulate material mixing proportions may depend on a number of application-specific factors which may include: the particle shape, size and type of particles; the bonding agent type; the desired degree of porosity; and the desired degree of flexibility for the end use of the structure. The ratio of the bonding agent to the particulate material may range from 1:7 to 1:15 by weight. Preferably, the mixing ratio is such that sufficient bonding agent is applied to coat at least some part of the surface of each particle during a mixing process but insufficient to fill the voids between the particles, thereby retaining as many as possible of the natural physical properties e.g. porosity of the loose particulate material. In a preferred example the composite fill material includes a mixture of sand and approximately 8% by weight of adhesive such as natural latex.

The mean mass aerodynamic diameter of the particulate material may range from 0.075 mm to 2.6 mm. The particulate material may include coarse sand (particles having a size of about 0.5 to 2 mm) and/or fine sand (particles having a size of about 0.05 to 0.5 mm). The size of the particulate material may be dependent upon the intended application of the structure.

Turning to the overall structure, the cells can be open, meaning that they have no top or base wall of fabric material, i.e. the composite filler material is only constrained in two dimensions and is exposed at the top and bottom surfaces of the structure. However, the top and/or bottom surface of the structure may be provided with cover means to protect the fill material from the external environment and/or to assist in handling.

In one embodiment the cellular structure may include a base formed of a preferably flexible material which can assist with the filling and manufacturing process. For example, the cellular structure may be formed on a piece of flexible material which forms the base of the structure before the fill material is introduced. A base layer could instead be inserted inside the cells before filling. The presence of such a base layer of material may improve the stability of the exposed composite. It is preferable that such a base layer will not interfere with the flexibility of the composite and thus the surface friction. A lightweight and flexible mesh material may be used, e.g. a PVC-coated polyester mesh.

It will be appreciated that a pre-filled cellular structure in accordance with the present invention may have a significant mass, particularly when the fill material includes a fine particulate material and thus has a relatively high density. This is advantageous for forming solid, immovable and indestructible barriers etc. However it can be difficult to lift and transport such high mass cellular units. It may be possible to use a fork lift truck, grabber, bale spike or other load lifting apparatus to bear the load of the cellular unit and enable transportation. However such machinery could damage the cellular unit e.g. by piercing or tearing. Where the cellular structure is flexible, as if preferred, this can make it more difficult to grip and handle. The Applicants have therefore devised a system which enables the load of a cellular unit to be supported for lifting and transportation. According to preferred embodiments the cellular structure, or each cellular unit of a cellular structure, has an associated frame for bearing the load of the unit.

It will be appreciated that such a load-bearing i.e. weight-supporting frame can be useful for any filled cellular unit, regardless of the fill material, e.g. as long as the unit is sealed to prevent the fill material from escaping when the unit is lifted. Advantageously the load-bearing frame may itself form a sealing base on which an open cellular unit can rest. For example, a frame could be used to form a base before the cellular unit is filled. This feature is therefore considered novel and inventive in its own right and thus from a second aspect the present invention provides a cellular structure including one or more cellular units, each unit made up of a plurality of interconnected cells of fabric material and the cells being at least partially filled with a fill material, wherein each cellular unit is associated with a frame for bearing the load of the unit. From a further aspect the present invention provides a method of forming a transportable cellular structure including: providing a frame; providing an open cellular unit including a plurality of interconnected cells of fabric material on or in the frame; at least partially filling the cellular unit with a fill material; and using the frame to support the weight of the filled unit to enable lifting and/or transportation of the structure.

It will be understood that the load-bearing/weight-supporting frame can take many different forms as long as it is able to support and transmit the load of its associated cellular unit, e.g. enabling the unit to be lifted and carried via the frame. Such a load-bearing frame is distinct from a framework which may be used to merely peg out or expand the cellular unit for filling, or a surrounding framework which merely houses the cellular unit.

Often the filled cells will be at least partially deformable rather than rigid, due to the fabric material preferably being flexible and the nature of the fill material. A particulate fill material e.g. sand may be typical in some applications. In other applications the fill material may be a resilient material. The cellular unit may therefore be difficult to grip and handle. The load-bearing frame can assist with supporting the cells and enable easier transportation.

Where the fill material is loose or fluid rather than solid, it is preferred that the frame provides a base for the open cellular unit, acting to seal it closed and prevent the escape of the fill material. The frame could provide a support plate on which the cellular unit rests, the plate forming a base for the cells. Alternatively a piece of material may be inserted inside the frame prior to placing the open cellular unit on or in the frame so as to form a base to the cells. The base may optionally be sealed before, during or after filling. This can allow the frame to have a more open structure. Even where the fill material is solid it may be desired that the base of the cells is closed by the frame or a sheet provided within the frame, e.g. in order to protect the exposed fill rather to prevent it from escaping. In preferred embodiments the fill material provides a resilient fill including a composite material, as described hereinabove. Preferably the filled cell are open at the top and bottom of the cellular unit. In its simplest form the frame could include a single cross-piece passing underneath the unit. However it is preferred that the frame includes at least two cross-pieces, preferably at 90° to one another, so as to provide torsional stability. Such cross-pieces could be arranged to pass from side-to-side or corner-to-corner. Additionally or alternatively the frame may provide support around the base perimeter of the unit. Preferably the frame is arranged such that the surface contact between the preferably resilient cellular unit and the ground is not compromised.

The frame could provide a flat support e.g. bed frame or plate on which the cellular unit rests. Suitable load bearing ropes, chains etc. could be attached to the flat frame member for lifting. A surrounding frame with a lip underneath the base of the cellular unit could be sufficient. However it is preferred that the load-bearing frame includes one or more upstanding members e.g. extending generally vertically against the cellular unit and/or one or more side members extending generally horizontally across the perimeter of the cellular unit. Such members can allow for easier attachment to load bearing means and can spread the load. Furthermore such upstanding and/or side members can be used to connect an upper load-bearing frame over the top of the cellular unit, for example to facilitate lifting by a fork lift truck, crane or HIAB-equipped lorry.

It has been appreciated that a load-bearing frame including upstanding members and/or side members can provide the further advantage of enabling cellular units to be coupled via the frames side-by-side and in vertically stacked arrangements, to build up cellular structures made of several units. Any suitable coupling means can be provided, e.g. clips, form-locking, nuts and blots, etc. In one example each frame includes an integral system of sockets and holes which can allow adjacent units to be coupled to one another, e.g. by means of flat or shaped metal links and bolts. Flexible connectors such as wire or rope can also be used, especially when the units are arranged on uneven ground. Integral linking or connection members may also be provided.

The load-bearing/weight-supporting frame can be relatively rigid and in some applications this may advantageously stiffen the cellular structure, especially when the fill material is flexible and/or resilient. However it is preferred for many applications that the load-bearing frame is flexible. While the individual frame members may each be rigid, e.g. metal bars or cross-pieces, the overall frame is preferably arranged so as to be able to flex/twist and move in an overall flexible and compliant fashion with the cellular units, e.g. upon impact. This can minimise the stresses on the individual structural members and connecting components, and help to transmit forces throughout the structure. In the case of a crash barrier or blast protection unit this can ensure that the presence of the frame(s) does not detract from the shock absorbing ability of the structure. Where a resilient e.g. composite fill material is used, as is preferred, the frame is preferably designed not to restrict the inherent flexibility and resilience of its associated cellular unit. Shock absorbing and blast resistance properties are preferably not compromised.

The flexibility of the frames can also help the structure to adapt to irregularities in the surface on which it is deployed. As noted above, maximising the surface area in contact with the ground increases the surface friction and helps the structure to resist movement under impact.

The load-bearing frame can also aid the manufacturing process, assisting with alignment and deployment of the cellular unit prior to filling. It is also envisaged that any gaps or spaces between the cellular unit and its frame may be filled with the same or a complementary fill material. This can enable the cellular unit and frame to be manufactured as an integral unit. It also advantageously increases the mass of each unit and can help to ensure even transmission of forces throughout the structure. Where, as is preferred, both the cellular unit and frame are flexible, using a resilient fill material to couple the cellular unit to the frame adds to the elastic shock absorbing response of the overall structure. Encapsulating the cellular unit in flexible e.g. composite fill material within its associated frame can also increase the surface area with the ground or other contacting surface. Filling the spaces between the cellular unit and the frame can be assisted by inserting a base layer into or beneath the frame, underneath the cellular unit, before filling, e.g. a base layer as described hereinabove.

All of the features and advantages described hereinabove with respect to the first aspect of the invention can be applied equally to a cellular structure including one or more cellular units having load-bearing frames. However, it will be appreciated that a structure in accordance with the second aspect of the invention is not limited to the use of a composite fill material, nor to the use of a particulate fill material. For example a suitable elastomeric resin or foam might be used.

Some general features will now be described in accordance with both aspects of the invention. The cells may be formed of any suitable fabric material exhibiting strength and flexibility, including woven, knitted and nonwoven fibrous webs. The fabric preferably includes a nonwoven material, further preferably a flexible nonwoven material. Such materials are often chosen for their durability. The basis weight may be in the range of 200 gsm to 1000 gsm and is preferably 320-350 gsm. It is further preferred that the nonwoven is polypropylene-based. A particularly preferred material is a non-woven fabric formed from bi-component fibres, e.g. polypropylene and polyethylene fibres, geotextile materials manufactured by Terram Limited. One such suitable material includes 70% polypropylene and 30% polyethylene. These materials have very good tensile strength, stiffness, puncture resistance and tear resistance, combined with flexibility. They may also be permeable to liquid.

Suitable fabric materials include spunbonded polypropylene nonwovens and other nonwoven and woven materials. Another example of a preferred material is a thermally bonded polypropylene nonwoven material such as is available from the US company Fiberweb™.

In a preferred embodiment the interconnected cells are formed from one or more interconnected continuous strips of fabric material. The strip(s) are folded back and forth, or layered against one another, adjacent parts of the strip(s) being bonded to each other at spaced apart locations such that the material defines an interconnected cellular unit. The cells so-formed are preferably tubular with the bonding points defining the corners of a generally square cross-section. The external cells in a unit may be bonded at fewer locations and are preferably partly cylindrical, e.g. defining a curved outer surface, especially when filled.

Preferably the cells are formed by applying an adhesive between the strip layers. Joints formed in this way have been found to be as strong as a nonwoven material itself. A special adhesive is preferred which can retain its bonding strength across a wide temperature range including extreme cold and extreme heat as found in some countries of the world.

Where cellular units are formed from a single strip, folded back and forth on itself and bonded, the ends of the strip is desirably removed or glued down. In other embodiments the cells (which are preferably tubular) may be manufactured individually and then interconnected at their corners and/or along their edges by any suitable means to give a cellular unit, e.g. containing 21 interconnected cells. The individual cells may be sewn together to form a unit of interconnected cells.

The fabric material may be treated either during or post manufacture to improve certain properties and/or appearance. For example, where the system may undergo prolonged exposure to sunlight the UV resistance of the fabric may be enhanced by adding appropriate stabilisers.

The cellular units or structures can be made on any macroscopic scale, although the invention has been found to apply in particular to structures having cell dimensions of the order 100-700 mm in diameter and 500-3000 mm deep. As the structures are pre-filled during manufacture rather than being filled on site, the cell dimensions can be reduced relative to known cellular structures, providing a comparable performance in a more compact structure. The interconnected cells may be manufactured so as to have any suitable shape such as triangular, rectangular, etc. However the cells are preferably circular or polygonal in cross-section. In preferred embodiments the cells are about 250 mm in diameter and 750 mm deep.

A yet further aspect of the invention provides a cellular unit for use in constructing a shock absorbing barrier or other resilient structure including at least three adjacent rows of interconnected tubular cells, each row including at least three interconnected adjacent cells, the cells being formed by a flexible nonwoven fabric and containing a resilient fill material. The resilient fill material preferably includes particles bonded within a resilient matrix formed by a bonding agent. The particles and/or the bonding agent may be elastomeric.

It is preferred that at least the external cells of the unit are partly generally cylindrical, so the external walls of the unit are undulating. Such an undulating outer surface can advantageously provide a cushioning effect and possibly act to deflect an impacting body. This aspect of the invention can additionally include any of the preferred features discussed above in relation to the first and second aspects thereof.

BRIEF DESCRIPTION OF THE DRAWINGS

Some preferred embodiments of the present invention will now be described, by way of example only, and with reference to the accompanying drawings, in which:

FIG. 3b is a perspective view of the cellular unit of FIG. 3a;

DETAILED DESCRIPTION

Figure 1:
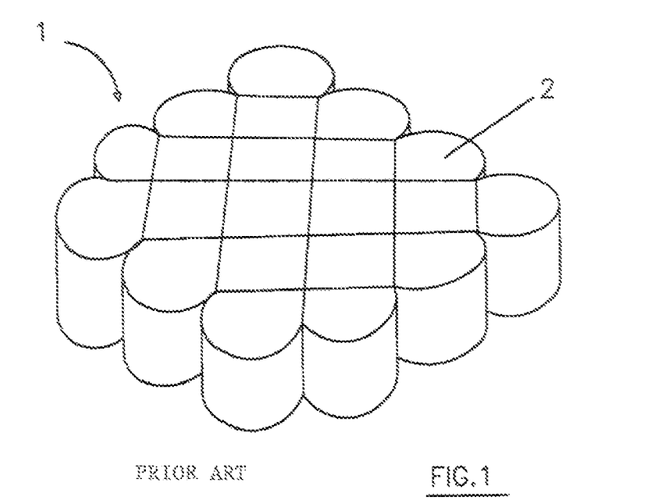
FIG. 1 shows a schematic perspective view of a prior art cellular confinement system.

There is shown in FIG. 1 a prior art cellular confinement system 1 including a number of interconnected cells 2 formed from a fabric material such as a nonwoven geotextile available from Terram Limited. For civil engineering applications such as erosion protection the cell diameter is typically 25-45 cm and the cell depth is typically 10-15 cm. For example, the 'Erocell 25' product manufactured by Terram Ltd. is available in a panel measuring 10 m×7 m and containing around 1900 cells sized 25×25×10 cm. The flexible panel is collapsed into a flat state and rolled up for ease of delivery. Upon arrival at the site the panel is expanded and may be anchored. The panel may be pinned out on the installation surface to retain the open cell shape and size before filling. Once the panel has been fixed and anchored in place, filling is carried out e.g. using a bulldozer to deposit soil, sand or other filler material as desired.

Figure 2:
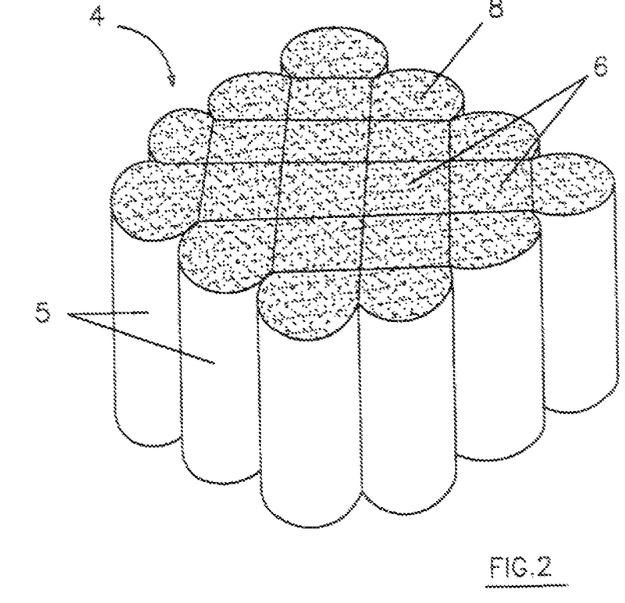
FIG. 2 shows a schematic perspective view of a cellular structure including a fill material in accordance with an embodiment of the invention.

There is shown in FIG. 2 a cellular structure in accordance with an embodiment of the present invention. The cellular unit 4 is made up of interconnected tubular cells 5, 6 formed of a geotextile material. The tubular cells 5, 6 have a diameter of 250 mm and a depth of 750 mm. The cellular unit 4 is taller than the cellular panels typically used in civil engineering applications.

Figure 3A:
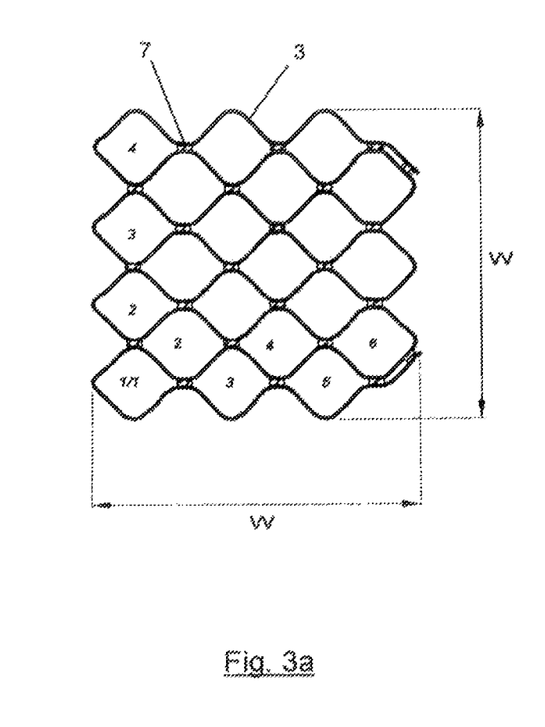
FIG. 3a shows a schematic plan view of a cellular unit.
Figure 3B:
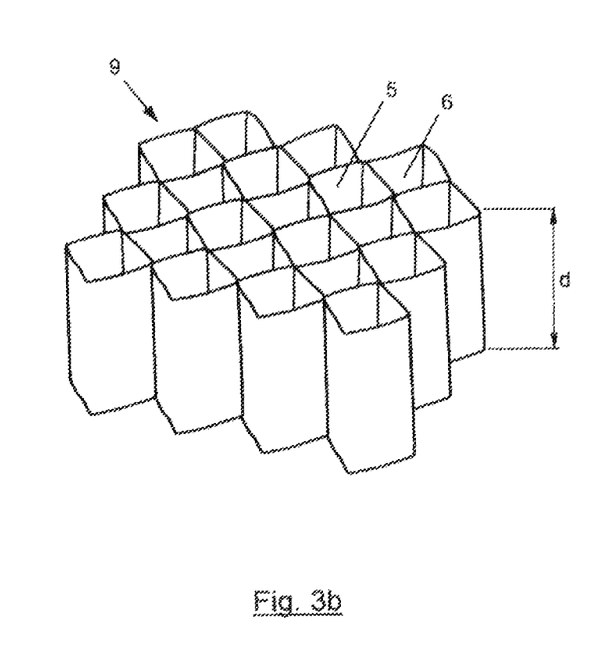

With reference to FIGS. 3a and 3b, the cellular structures of FIG. 2 may be formed by taking a strip 3 of nonwoven material and folding it back and forth onto itself. The strip 3 has a depth d of 750 mm. Before each fold, adhesive 7 is applied at a number of spaced apart locations along the strip 3. The resultant pleated stack is then openable into a panel 9 having 21 generally tubular, interconnected cells 5, 6 formed by the folded layers between the adhesive locations. The overall width w of the panel 9 is about 1 metre. Adhesive joints formed in this way have been found to be up to 85% as strong as the nonwoven material itself. A special adhesive is preferred which can retain its bonding strength across a wide temperature range.

According to another preferred method of manufacture the tubular cells 5, 6 may be formed individually and then interconnected by stitching instead of using adhesive. The choice of sewn joints instead of adhesive joints may depend on the material used for the cells.

Turning back to FIG. 2, it can be seen that all of the tubular cells 5, 6 of the cellular unit 4 are filled with a resilient composite material 8 which in this embodiment is a mixture of sand and natural latex. The mixture ratio is approximately 8% of adhesive by weight. Calcium chloride granules or any other suitable catalyst is added to the mixture at the point of filling to initiate chemical cross-linking of the latex rubber. The resultant composite fill material 8 is solid but porous to liquids and gases. The latex bonding agent acts to bind together the sand particles and to bond the composite 8 to the geotextile fabric of the cells 5, 6. Both the composite material 8 and the fabric material of the cells 6 are flexible, resulting in an elastic and deformable cellular unit 4.

Of course, the composite fill material 8 may not completely fill each cell 5, 6. Preferably the composite fill material 8 forms a base and/or upper fill layer for the cells 5, 6. The rest of the fill may be formed by another fill material, such as an unbonded fill material. One material suitable for filling the 'core' of the cells is a mixture of particulate material such as sand with a binder such as polypropylene fibres.

It will be seen that the cellular unit 4 has an undulating outer surface formed by the partly cylindrical tubular cells 5 around the outside of the unit 4. The interior of the unit 4 includes generally polygonal tubular cells 6 formed by the intersecting internal fabric walls and bonding points. Whereas the fabric walls of the inner cells 6 are constrained, the outwardly-facing walls of the perimeter cells 5 are more free to bulge upon filling, resulting in a curved outer surface to each perimeter cell 5.

The cells 5, 6 are open at the top and bottom of the cellular unit 4. Thus when the unit 4 is laid on a surface the composite fill material 8 is in direct contact with the surface and its conformability provides a high coefficient of friction. Alternatively, the cellular unit 4 can include a base sheet (not shown) to improve stability for the exposed composite 8 on the base of the structure. Such a base sheet is preferably flexible so as not to reduce the coefficient of surface friction. The cellular unit 4 may be placed on such a base sheet prior to filling in order to assist with the manufacturing process. A sheet of lightweight PVC-coated polyester mesh may be used. Other base and/or top sheets can be applied as desired e.g. for particular applications.

The cellular unit 4 shown in FIG. 2 can be deployed on its own e.g. as a defensive unit or it can be stacked with other units to form a larger barrier structure. The undulating outer surface of the cellular unit 4 can provide a cushioning effect. It can also help to interlock adjacent units in a partially tesselated arrangement.

Figure 4:
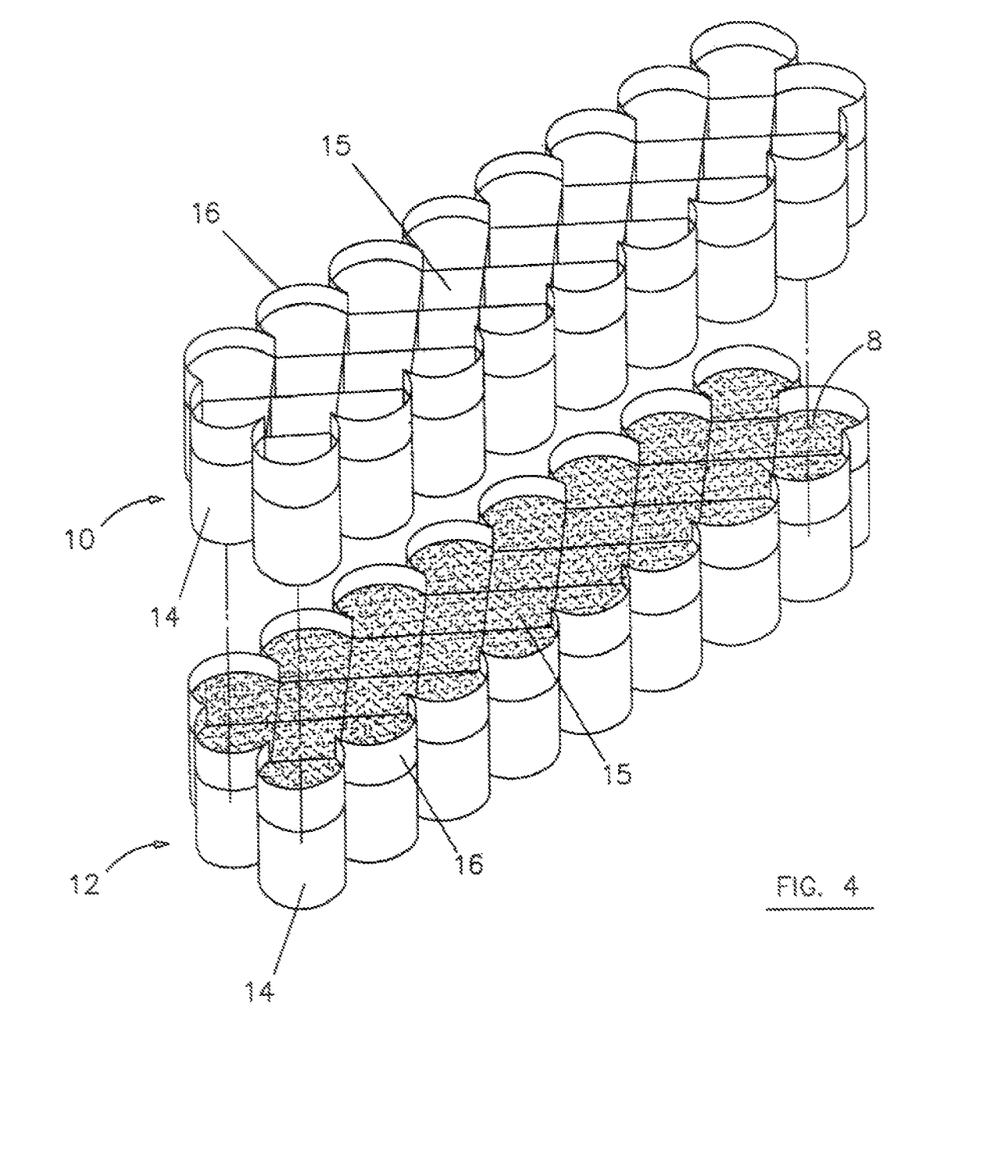
FIG. 4 shows a schematic exploded view of two stacked cellular structures in accordance with an embodiment of the invention.

FIG. 4 shows a cellular structure 10 being stacked on top of another cellular structure 12. Both structures 10, 12 include interconnected tubular cells 14, 15 of a flexible geotextile material. The base structure 12 may be a single cellular unit or it may be made up of more than one cellular unit stacked side-by-side. The outer cells 14 and inner cells 15 of the base structure 12 are filled with a composite fill material 8 in the same way as is described above with respect to FIG. 2. As before, the cellular structure 12 has an undulating outer surface formed by the partly cylindrical perimeter cells 14 around the outside of the structure 12. The structure 12 therefore provides a cushioning outer surface particularly suitable for use as a crash barrier or the like. The undulating outer surface can advantageously enhance the resilient response of the structure 12 and could even result in deflection of an impacting body.

The cellular structures 10, 12 shown in FIG. 4 differ from that of FIGS. 2 and 3b in that each structure 10, 12 is provided with a skirting band 16 around the upper perimeter of the structure 10, 12. The skirting strip 16 can be formed from a different material to the cells 14, 15 such as a stiff plastic, e.g. HDPE or PVC, for reinforcement purposes. Due to the solid nature of the bonded composite fill material 8, the skirting strip 16 is not required to prevent particulate material escaping from between the structures 10, 12, and is preferably omitted. The skirting strip 16 is merely shown for illustrative purposes. Where employed, preferably the skirting band 16 is formed from a strip of the same geotextile material as the cells 14, 15. The skirt portion is preferably flexible and/or liquid permeable, like the fabric material of the cells 14, 15, making it easier to bend the strip 16 around the cells and tuck the band 16 inside or against the cell walls of juxtaposed structures. Although the material is flexible enough to allow the band 16 to bend into the desired shape, it is also sufficiently stiff that the band 16 will hold its shape and lie flat against the cell walls.

The skirting strip 16 is wrapped around the outside of the perimeter cells 14 in the cellular structures 10, 12 and fixedly attached to an upper part of the cell walls. The skirting strip 16 may be attached to the outside of the cells 14 by sewing and/or gluing, for example. The attachment method used may depend on the respective material(s). A slotted band 16 may instead be fitted inside the cells 14, adjacent to the perimeter walls, and fixedly attached if required. Of course, the skirting strip 16 may not extend around the whole perimeter of the structures 10, 12, and more than one strip 16 may be used.

The skirting strip 16 is attached at the upper end of the base structure 12, partially overlapping with a top portion of the perimeter cell walls and extending above the top of the cells 14 so as to form an upstanding skirt portion. For cells that are 150 cm deep the skirting band 16 may be, for example, 15 to 45 cm deep, with some of the skirting strip 16 overlapping with the cell walls and at least half of its depth left protruding beyond the top of the cell walls. The material of the skirting strip 16 is sufficiently rigid that the strip 16 stands up vertically without substantially crumpling or bending.

FIG. 4 illustrates that when stacking two cellular structures 10, 12, the lower portion of the cell walls in the upper structure 10 fit inside the skirting strip 16 which extends around the perimeter of the lower structure 12. The skirting strip 16 may optionally be fixedly attached to or held against the cell walls of the upper structure 10 by any suitable means e.g. adhesive, sewing, fasteners, etc. The skirting band 16 can help to guide and align the cells when stacking such structures 10, 12 on top of one another. The resultant wall or barrier structure will have substantially vertical perimeter walls on all sides with a reinforcing seal being formed by the skirting strip 16 between the vertically juxtaposed structures 10, 12. The skirting portion may improve the overall strength and impact resistance of the stacked structure. However, such a skirting strip or other such seal means is in no way essential, and is in fact omitted in preferred embodiments of the invention.

As the external skirting strip 16 extends upwardly, the cellular structures 10, 12 can be stacked or deployed in any order and can be used the same way up in all of the layers, making it simple to construct a stacked system. When a number of structures have been stacked on top of one another, e.g. to form a wall or barrier, the skirting strip 16 protruding from the uppermost structure can be folded down to at least partially cover the exposed fill material. Folding of the skirt portion is possible due to the flexibility of the fabric material. Alternatively (but not shown), the skirting band 16 may be integrally formed with the cell walls e.g. where the structures 10, 12 are formed of a single cellular unit. For example, the perimeter cells 14 of a cellular unit may be provided with split wall dimensions. The inwardly-facing half of a perimeter cell 14 may be of a standard depth matching the inner cells 14 in the unit while the outwardly-facing half of each perimeter cell 14 may have an extended wall which is deeper than standard, the extended wall portion acting as a skirt.

The upper cellular structure 10 may be stacked on top of the lower structure 12 before being filled, as shown, or one or more pre-filled structures may be stacked up. However, for ease of handling it may be preferred to manufacture a barrier by filling each cellular structure as it is stacked. Curing of the fill material during stacking can advantageously provide bonding between the stacked layers.

Figure 5:
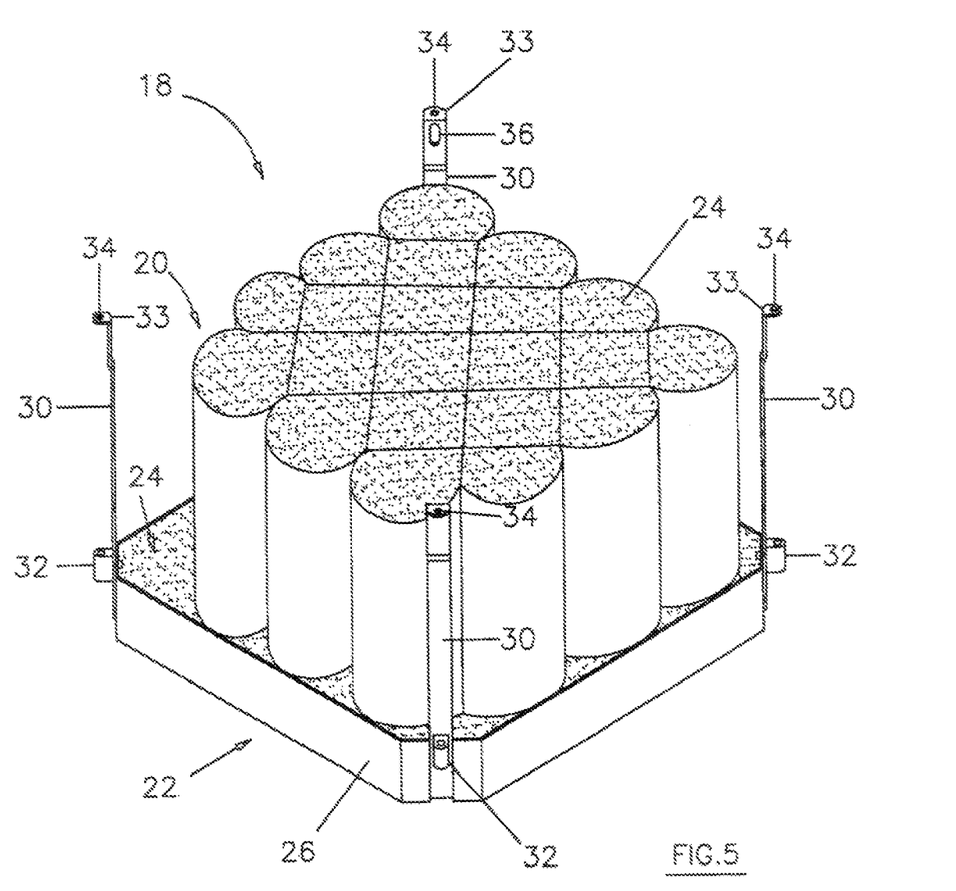
FIG. 5 shows a schematic perspective view of a filled cellular unit and associated frame in accordance with a preferred embodiment of the invention.
Figure 6:
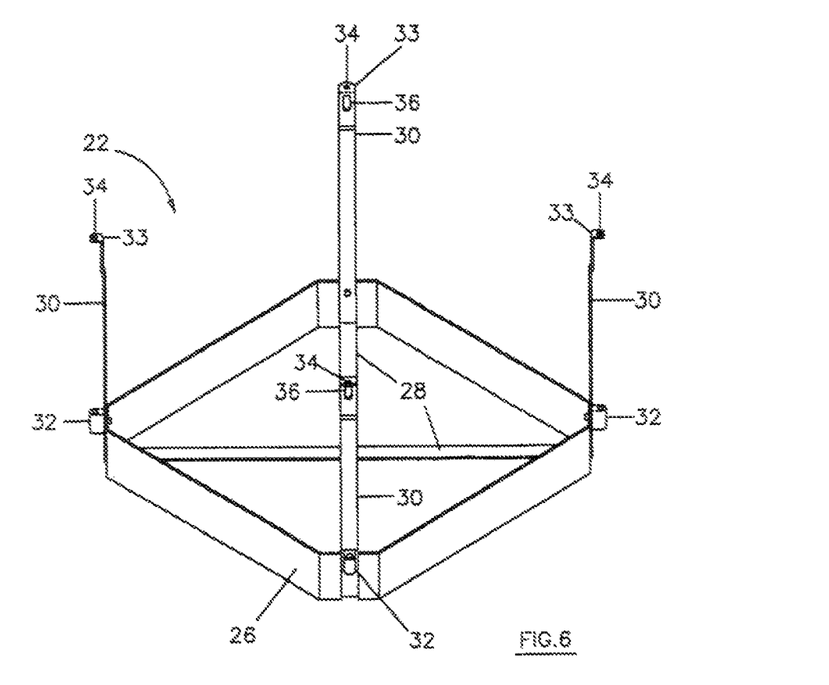
FIG. 6 is an exploded view of the cellular structure of FIG. 5.
Figure 7:
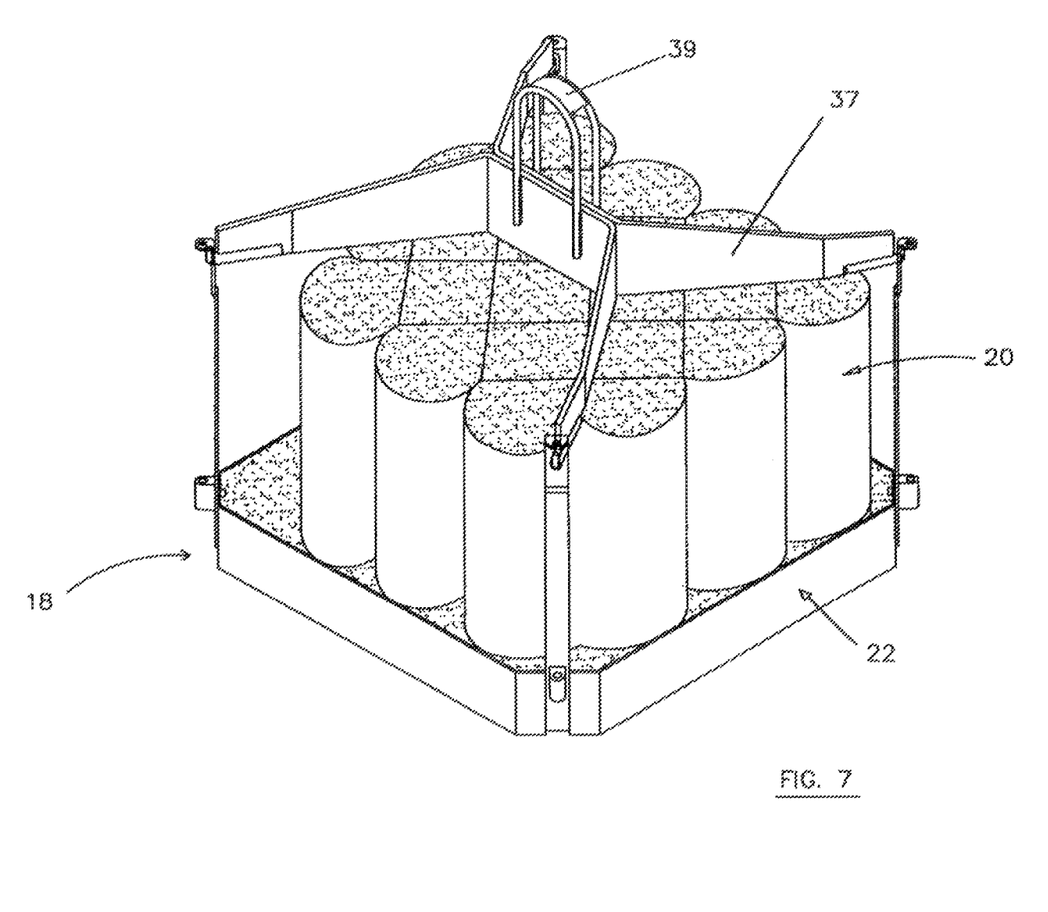
FIG. 7 shows the cellular structure of FIG. 5 with the addition of a lifting frame.

With reference to FIGS. 5 to 7 a cellular structure 18 in accordance with a preferred embodiment includes a cellular unit 20 embedded within a load-bearing frame 22. The cellular unit 20 is substantially the same as that described above with respect to FIG. 2, i.e. the fill material 24 is a sand/adhesive composite, and those features described above will not be repeated. However, the cellular unit 20 may be filled instead with a different material, for example a solid particulate material such as concrete, aggregate, ballast materials (e.g. brick, broken concrete, granite, limestone, sandstone, shingle, slag and stone), crushed rock, gravel, sand, clay, peat or soil, or any mixture of these. As is preferred, the cellular unit 20 is not provided with any kind of skirting strip around its upper periphery.

The load-bearing frame 22 includes an outer frame ring 26 to which there are attached two diagonal cross-pieces 28 which form the base of the frame 22. Four upright members 30 are attached at a lower portion to the corners of the frame ring 26 and are designed to extend slightly higher than the cellular unit 20, to allow for coupling to another frame stacked above. Further frame rings can be provided, e.g. spaced over the vertical extent of the structure. The frame 22 is sized to generally match the perimeter of the cellular unit 20 and to maximise the points of the contact between the cellular unit 20 and the frame 22. The base of the cellular unit 20 is covered by a sheet 21 of flexible fabric material such as a lightweight PVC-coated polyester mesh. The base sheet 21 is too thin to be discernible in FIG. 6. The base sheet 21 is inserted inside the frame 22, over the cross-pieces 28, but in an alternative embodiment it could extend at least partially beneath the frame ring 26 instead or as well.

It will be understood that the use of two diagonal cross-pieces 28 can stabilise the frame ring 26 to an extent but will still allow the frame 22 to twist and bend. In particular, the base of the frame 22 can conform to an uneven surface. The cross-pieces 28 are preferably thin and narrow so as to interfere as little as possible with the contact between the cellular unit 20 and the ground, while still bearing the load of the cellular unit 20 and transmitting the load to the rest of the frame 22. The frame 22 is preferably made of stiff metal components.

The upright corner members 30 are provided with sockets 32 spaced slightly from the bottom of the frame. The top of each upright member 30 terminates in a right angle and a horizontal connector 33 with a hole 34 which is arranged align with the socket 32 on a frame stacked above, as will be explained in more detail below. The upright members 30 are also provided with holes 36 which allow for connection of a top lifting frame 37 or other hoisting means, e.g. as shown in FIG. 7. The exemplary lifting frame 37 includes a loop 39 centred over the cellular unit 20 which facilitates rapid deployment of the structure 18, for example by a fork lift truck, crane or HIAB-equipped lorry. The lifting frame 37 is designed to spread the load carried by the supporting frame 22.

The cellular structure 18 is manufactured as follows. The frame 22 is constructed and a base sheet 21 is inserted inside the frame ring 26, on top of the cross-pieces 28. Next the cellular sub-assembly of the cellular unit 20 is opened out and stood on top of the base sheet 21, inside the frame 22. The cellular sub-assembly may be provided collapsed in flat-pack form or even flattened and rolled up. To aid in opening out the cellular sub-assembly, the cells may be pinned open prior to filling. The fill material 24, for example a mixture of sand and latex adhesive together with a cross-linking catalyst, is then poured into the tubular cells to fill them to the desired level and left to solidify. If a particulate fill material is used without a bonding agent then compaction may be required.

In order to increase the mass of the cellular structure 18 and the coupling between the cellular unit 20 and the frame 22, the fill material 24 is also preferably poured into the gaps between the perimeter walls of the cellular unit 20 and the frame ring 26. It will be seen from FIGS. 5 to 7 that the lower end of the cells are effectively encased by the fill material 24 within the frame ring 26. The fill material 24 may not bond completely to the frame 22 but it will help to transmit forces and enable the overall structure to bend and flex in a unified response e.g. to impact.

The cellular structure 18 can be used on its own or in combination with other such structures. The load-bearing frame 22 allows each cellular unit 20 to be more easily handled, e.g. picked up and transported to a desired location for use. As the structure 18 is pre-filled it can be rapidly deployed to instantly form a barrier or defensive wall. The size of the structure 18 can be adapted depending on its intended use.

Figure 8:
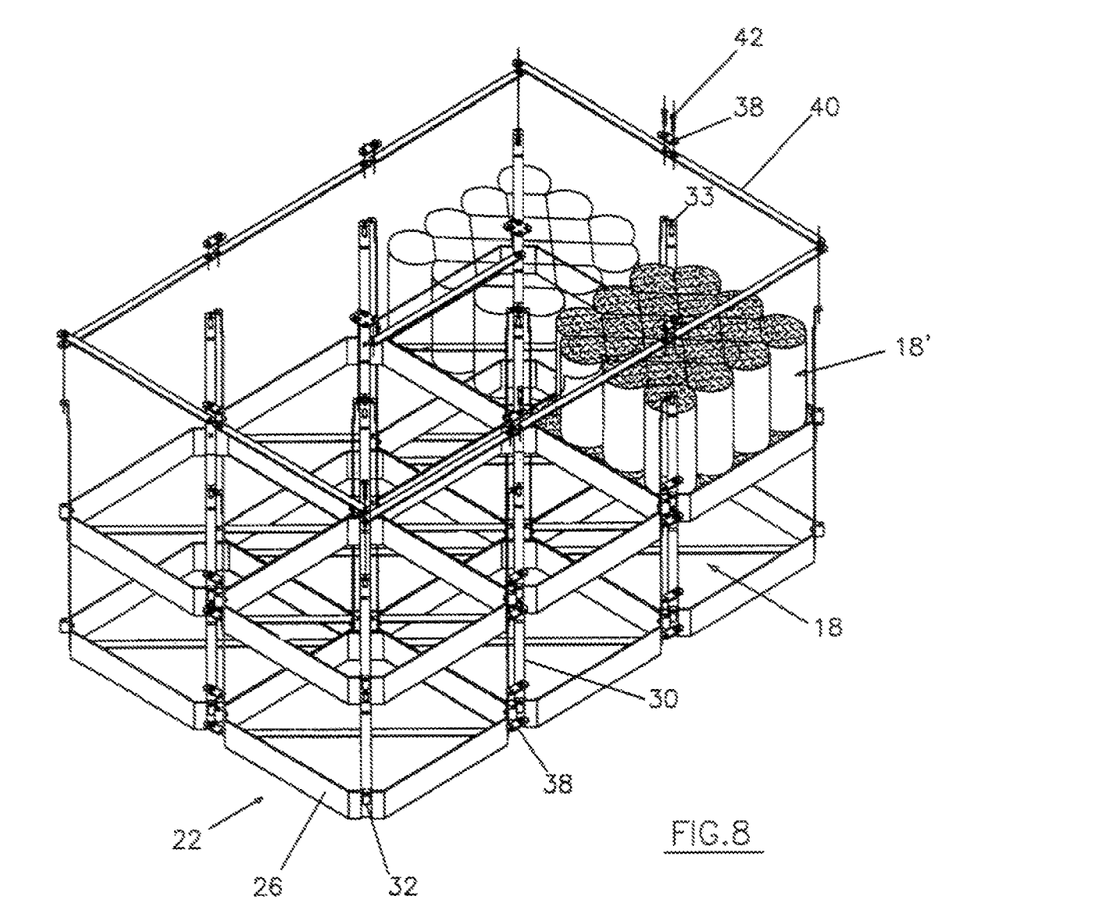
FIG. 8 shows a barrier or wall formed from the cellular structures of FIG. 5.

FIG. 8 shows one example of how a barrier structure can be built up from a plurality of pre-filled cellular structures 18. In this example, 12 cellular structures 18, 18', each with their own frames, are interconnected to form a crash barrier capable of passing the British Standard PAS 68 vehicle crash test. The structures 18, 18' may not all have the same fill material. Each structure 18, 18' may also contain a mixture of fill materials within its cells.

Structures 18, 18' stacked side-by-side are connected to one another by link plates 38 which couple adjacent sockets 32. The link plates 38 may be bolted or screwed against the sockets 32. It can be seen that the bevelled corners of the frame rings 26 leave room for the sockets 32 to abut and space to insert a link plate 38 between them. Link plates 38 can be attached both above and below each pair of coupled sockets 32.

An upper structure 18' can be stacked on top of a lower structure 18 with the horizontal connectors 33 and holes 34 at the top of an upstanding member 30 of the lower structure 18 aligned underneath the sockets 32 of the upper structure 18'. The vertically stacked upright members 30 can then be bolted together via the sockets 32 and connectors 33. Link plates 38 are used to sandwich the sockets 32 and connectors 33. While the connections hold adjacent structures 18, 18' firmly together both horizontally and vertically, the spacing between connections at the corners of each frame 22 ensures that the overall barrier is not rigid and can still flex upon impact.

It is also shown in FIG. 8 how horizontal struts 40 can be fixed across the top perimeter of a frame 22, extending between the connectors 33, e.g. by bolts 42 passing through the strut 40 and a corner connector 33 below. Link plates 38 can be used to span adjacent struts 40 and to couple together adjacent uprights 30 at the same time. Adjacent frames 22 are therefore connected together at both their upper and lower ends, even in the top layer of a stack.

It will be appreciated that FIG. 8 merely illustrates one examples of a barrier system and that the cellular structures 18 can be stacked both horizontally and/or vertically in as many layers as is desired to form a barrier of desired dimensions.

The invention claimed is:

1. A method, comprising:
at least partially filling an open cellular unit with a first fill material comprising a composite fill material comprising a mixture of first particulate material and a bonding agent, the open cellular unit comprising a plurality of interconnected cells comprising a fabric material, and the open cellular unit being on or in a frame;
curing the first fill material to provide a layer of a solid bonded composite fill material;
depositing a second fill material onto the layer of the solid bonded composite fill material, the second fill material comprising a second particulate material, wherein the second particulate material is the same or different from the first particulate material; and
using the frame to lift and/or transport the filled open cellular unit.

2. The method of claim 1, wherein the frame comprises (i) an outer frame ring; (ii) at least one cross-piece attached to the outer frame ring and configured to pass underneath the open cellular unit; and (iii) at least one upright member attached to the outer frame ring and extending in a vertical direction from the outer frame ring.

3. The method of claim 2, wherein the at least one upright member includes a first end proximate to the outer frame ring and a second end distal from the outer frame member, and wherein the first end includes a socket and the second end includes a hole aligned with the socket.

4. The method of claim 1, wherein the fabric comprises a single strip of fabric folded back and forth on itself to form the plurality of interconnected cells.

5. The method of claim 1, wherein the bonding agent bonds the solid bonded composite fill material to the fabric material.

6. The method of claim 1, wherein the solid bonded composite fill material defines a lowermost layer.

7. The method of claim 1, wherein the solid bonded composite fill material defines an uppermost layer.

8. The method of claim 1, wherein the bonding agent comprises an elastomeric material.

9. The method of claim 1, wherein the solid bonded composite fill material has a ratio of the bonding agent to the first particulate material ranging from 1:7 to 1:15 by weight.

10. The method of claim 1, wherein the plurality of interconnected cells are open such that the solid bonded composite fill material is exposed at a top surface of the cellular structure, a bottom surface of the cellular structure, or both.

11. The method of claim 10, further comprising depositing a second layer of the composite fill material onto the second fill material and curing the second layer of the composite fill material to provide a layer of a second solid bonded composite fill material; wherein the second fill material is contained between the solid bonded composite fill material and the second solid bonded composite fill material.

* * * * *